United States Patent [19]
Chibata et al.

[11] 3,871,959

[45] Mar. 18, 1975

[54] FERMENTATIVE PRODUCTION OF D-ALANINE

[75] Inventors: Ichiro Chibata; Shigeki Yamada, both of Osaka; Mitsuru Wada, Nara; Haruko Maeshima, Osaka; Nobuhiko Izuo, Yamatotakada, all of Japan

[73] Assignee: Tanabe Seiyaku Co., Ltd., Osaka, Japan

[22] Filed: July 17, 1973

[21] Appl. No.: 379,956

[30] Foreign Application Priority Data
July 28, 1972 Japan.............................. 47-76329

[52] U.S. Cl...................... 195/29, 195/28, 195/30, 195/47

[51] Int. Cl............................................. C12d 13/06
[58] Field of Search .................... 195/28, 29, 30, 47

[56] References Cited
OTHER PUBLICATIONS
Chemical Abstracts, Vol. 78, 157847q, 1973.

*Primary Examiner*—Lionel M. Shapiro
*Assistant Examiner*—Robert J. Warden
*Attorney, Agent, or Firm*—Bierman & Bierman

[57] ABSTRACT

A D-alanine-producing strain of *Corynebacterium fascians* is cultivated in an aqueous nutrient medium under an aerobic conditions. D-alanine is recovered from the fermentation broth.

19 Claims, No Drawings

FERMENTATIVE PRODUCTION OF D-ALANINE

This invention relates to fermentative production of D-alanine.

D-alanine is useful as a biochemical or a starting material in the synthesis of peptides and antibacterial agents (Belgian Pat. No. 770888; The Journal of Biological Chemistry 246 (1971), No. 4, 986 – 993). It is also useful to promote the growth of lentils and wheat (Chemical Abstracts 72 (1970), 77694y).

Various methods for the fermentative production of L- or DL-alanine are known. For example, L-alanine may be produced by cultivating a mutant of *Micrococcus sodonensis* (Journal of Bacteriology 94, 1249 – 1250) or a Gram negative short rod designated as Strain No. 483 (Journal of the Agricultural Chemical Society of Japan, 34 (1960), 832 – 838). Moreover, DL-alanine may be prepared by fermentation of *Corynebacterium gelatinosum* No. 7183 (Journal of the Agricultural Chemical Society of Japan, 35 (1961), 862 – 867). However, no selective fermentative production of the D-alanine isomer has been reported.

One object of the present invention is to provide a novel fermentative method of selectively producing D-alanine. Another object of the invention is to provide a method which is suitable for the commercial and industrial production of D-alanine. Still another object is to provide a method which enables the production of D-alanine in a high yield by a simple procedure. Further objects of the invention will be apparent from the discolosure which follows.

In accordance with the present invention, D-alanine can be produced by cultivating a D-alanine-producing strain of *Corynebacterium fascians* in an aqueous nutrient medium under aerobic conditions, and recovering the accumulated D-alanine from the fermentation broth.

The fermentation of a D-alanine-producing strain of *Corynebacterium fascians* such as *Corynebacterium fascians* ATCC No. 21950 may be conducted by either shaking cultivation or submerged fermentation under aeration. It is preferred to carry out the fermentation at a pH of 5.0 to 9.0, especially at a pH of about 7.0. When the pH of the nutrient medium is adjusted within the above-mentioned range prior to the fermentation, re-adjustment of the pH of the medium may be unnecessary because it scarcely varies during the fermentation. The preferred temperature range for the fermentation is 20° to 37°C, especially 25° to 30°C. The aqueous nutrient medium of the invention should contain a carbon source and a nitrogen source. Suitable sources of carbon include polyalcohols (e.g., glycerol), sugar alcohols (e.g., sorbitol) and monosaccharides (e.g., glucose, sorbose, and fructose). Inorganic ammonium salts such as ammonium phosphate and ammonium sulfate are suitable as the sources of nitrogen. In some case, sodium phosphate, potassium phosphate, calcium carbonate and the like may be further added to the nutrient medium. The preferred amount of the carbon source which is added to the medium is within the range of 1 to 14 percent, especially 3 to 10 percent. On the other hand, the preferred amount of the nitrogen source is 0.3 to 10 percent, especially 1 to 8 percent. In carrying out the fermentation of the present invention, D-alanine-productivity of the above-mentioned microorganism may be enhanced by addition of corn steep liquor. For this purpose, it is preferred to add 0.01 to 1.0 percent, especially 0.05 to 0.5 percent, of corn steep liquor to the nutrient medium. Alternatively, a mixture of an organic nitrogen source, vitamins and minerals may be employed instead of corn steep liquor in order to enhance the D-alanine-productivity of the microorganism. The fermentation of the present invention can be accomplished in about 24 to 120 hours. D-alanine is accumulated in the fermentation broth.

After the fermentation is completed, cells and other solid compositions are removed from the fermentation broth by conventional procedures such as filtration or centrifugation. Known procedures may be employed in the recovery and/or purification of D-alanine from the filtrate or supernatant solution. For example, the filtered fermentation broth is passed through or treated with a strong cation exchange resin. Then, the resin is eluted with a dilute alkaline solution such as aqueous ammonia. D-alanine is readily recovered by evaporating the eluate.

Practical and presently-preferred embodiments of the present invention are illustratively shown in the following Examples. In this specification, all percentages of the fermentation medium are expressed as weight/volume.

EXAMPLE 1

A loopful of *Corynebacterium fascians* ATCC No. 21950 is inoculated into 100 ml of an aqueous nutrient medium (pH 7.0) containing 1% glycerol, 1% ammonium phosphate and 0.15% corn steep liquor. The medium is cultivated at 30°C for 2 days under shaking. A seed culture is obtained.

100 ml of an aqueous nutrient medium (pH 7.0) containing 5% glycerol, 4% ammonium phosphate and 0.4% corn steep liquor are charged into a 500 ml shaking flask, and the medium is sterilized at 120°C for 10 minutes by autoclaving. 5 ml of the seed culture are added to the medium. The medium is then cultivated at 30°C for 5 days under shaking. The fermentation medium thus obtained contains 7 mg/ml of D-alanine.

One liter of the fermentation medium is filtered by centrifugation. The supernatant solution is treated with an active carbon and then passed through a column of cation exchange resin (H-form) manufactured by Rohm & Haas Co., under the trade name "Amberlite IR-120". After washing with water, the column is eluted with an aqueous 2N-ammonia solution. The eluate is evaporated to dryness under reduced pressure. Ethanol is added to the residue obtained, and the crystalline precipitate is collected by filtration. The precipitate is recystallized from an aqueous ethanol. 5.6 g of D-alanine are obtained. $[\alpha]_D^{25} = -14°$ (C = 2, 5N—HCl)

EXAMPLE 2

A loopful of *Corynebacterium fascians* ATCC No. 21950 is inoculated into 100 ml of an aqueous nutrient medium (pH 7.0) containing 1% glucose, 1% ammonium phosphate and 0.15% corn steep liquor. The medium is cultivated at 30°C for 2 days under shaking. A seed culture is obtained.

120 ml of an aqueous nutrient medium (pH 7.0) containing 3% glucose, 4% ammonium phosphate and 0.15% corn steep liquor are charged into a 500 ml shaking flask, and the medium is sterilized at 120°C for 10 minutes by autoclaving. 6 ml of the seed culture are added to the medium. Then, the medium is cultivated at 30°C for 5 days under shaking. The fermentation medium thus obtained contains 6 mg/ml of D-alanine.

One liter of the fermentation medium is treated in the same manner as described in Example 1. 4.8 g of D-alanine are obtained. $[\alpha]_D^{25} = -14°$ (C = 2, 5N—HCl)

EXAMPLE 3

120 ml of an aqueous nutrient medium (pH 7.0) containing 8 % glucose, 2 % sodium phosphate, 2 % ammonium sulfate, 1 % corn steep liquor and 1 % calcium carbonate are charged into a 500 ml shaking flask. The medium is sterilized at 120°C for 10 minutes by autoclaving. 6 ml of a seed culture prepared in the same manner as described in Example 2 are added to the medium. The medium is then cultivated at 30°C for 4 days under shaking. The fermentation medium thus obtained contains 8 mg/ml of D-alanine.

One liter of the fermentation medium is treated in the same manner as described in Example 1. 6.5 g of D-alanine are obtained. $[\alpha]_D^{25} = -14°$ (C = 2, 5N—HCl)

EXAMPLE 4

A loopful of *Corynebacterium fascians* ATCC No. 21950 is inoculated into 100 ml of an aqueous nutrient medium (pH 7.0) containing 1 % sorbitol, 1 % ammonium phosphate and 0.15 % corn steep liquor. The medium is cultivated at 30°C for 2 days under shaking. A seed culture is obtained.

120 ml of an aqueous nutrient medium (pH 7.0) containing 3 % sorbitol, 1 % ammonium phosphate and 0.15 % corn steep liquor are charged into a 500 ml shaking flask, and the medium is sterilized at 120°C for 10 minutes by autoclaving. 6 ml of the seed culture are added to the medium. The medium is then cultivated at 30°C for 5 days under shaking. The fermentation medium thus obtained contains 5 mg/ml of D-alanine.

EXAMPLE 5

A loopful of *Corynebacterium fascians* ATCC No. 21950 is inoculated into 100 ml of an aqueous nutrient medium (pH 7.0) containing 1 % sorbose, 1 % ammonium phosphate and 0.15 % corn steep liquor. The medium is cultivated at 30°C for 2 days under shaking. A seed culture is obtained.

120 ml of an aqueous nutrient medium (pH 7.0) containing 3 % sorbose, 4 % ammonium phosphate and 0.15 % corn steep liquor are charged into a 500 ml shaking flask, and the medium is sterilized at 120°C for 10 minutes by autoclaving. 6 ml of the seed culture are added to the medium. The medium then cultivated at 30°C for 5 days under shaking. The fermentation medium thus obtained contains 5 mg/ml of D-alanine.

EXAMPLE 6

A loopful of *Corynebacterium facians* ATCC No. 21950 is inoculated into 100 ml of an aqueous nutrient medium (pH 7.0) containing 1 % fructose, 1 % ammonium phosphate and 0.15 % corn steep liquor. The medium is cultivated at 30°C for 2 days under shaking. A seed culture is obtained.

120 ml of an aqueous nutrient medium (pH 7.0) containing 3 % fructose, 4 % ammonium phosphate and 0.15 % corn steep liquor are charged into a 500 ml shaking flask, and the medium is sterilized at 120°C for 10 minutes by autoclaving. 6 ml of the seed culture are added to the medium. The medium then cultivated at 30°C for 5 days under shaking. The fermentation medium thus obtained contains 4.5 mg/ml of D-alanine.

What we claim is:

1. A process for producing D-alanine which comprises cultivating a *Corynebacterium fascians* ATCC No. 21950 in an aqueous nutrient medium under aerobic conditions to produce a fermentation broth, and recovering D-alanine from the fermentation broth.

2. The process according to claim 1, wherein the cultivation is carried out at a pH of 5.0 to 9.0 and at a temperature of 20° to 37°C.

3. The process according to claim 1, wherein the cultivation is carried out at a pH of about 7.0 and at a temperature of 25° to 30°C.

4. The process according to claim 1, wherein the the aqueous nutrient medium contains an assimilable carbon source and an assimilable nitrogen source.

5. The process according to claim 1, wherein the aqueous nutrient medium contains 1 to 14 percent of an assimilable carbon source and 0.3 to 10 percent of an assimilable nitrogen source, and the cultivation is carried out at a pH of 5.0 to 9.0 and at a temperature of 20° to 37°C.

6. The process according to claim 5, wherein the assimilable carbon source is selected from the group consisting of a polyalcohol, a sugar alcohol and a monosaccharide, and the assimilable nitrogen source is an inorganic ammonium salt.

7. The process according to claim 5, wherein the assimilable carbon source is selected from the group consisting of glycerol, sorbitol, glucose, sorbose and fructose, and the assimilable nitrogen source is selected from the group consisting of ammonium phosphate and ammonium sulfate.

8. The process according to claim 5, wherein 1 to 5 percent of at least one of sodium phosphate, potassium phosphate and ammonium phosphate is further added to the nutrient medium.

9. The process according to claim 5, wherein 0.01 to 0.7 percent of corn steep liquor is further added to the nutrient medium.

10. The process according to claim 5, wherein 0.05 to 0.5 percent of corn steep liquor is further added to the nutrient medium.

11. The process according to claim 5, wherein 0.05 to 0.5 percent of corn steep liquor and 1 to 5 percent of at least one of sodium phosphate, potassium phosphate and ammonium phosphate are further added to the nutrient medium.

12. The process according to claim 5, wherein 0.3 to 2 percent of calcium carbonate is further added to the nutrient medium.

13. The process according to claim 5, wherein 0.05 to 0.5 percent of corn steep liquor, 0.3 to 2.0 percent of calcium carbonate and 1 to 5 percent of at least one of sodium phosphate, potassium phosphate and ammonium phosphate are further added to the nutrient medium.

14. The process according to claim 1, wherein the aqueous nutrient medium contains 3 to 10 percent of an assimilable carbon source and 1 to 8 percent of an assimilable nitrogen source, and the cultivation is carried out at a pH of 5.0 to 9.0 and at a temperature of 20° to 37°C.

15. The process according to claim 1, wherein the recovery of D-alanine is carried out by the steps of filtering or centrifuging the fermentation broth, treating the resultant filtrate or supernatant solution with a strong cation exchange resin, eluting the strong cation exchange resin with a dilute alkaline solution, and then evaporating the eluate obtained.

16. A process for producing D-alanine which comprises cultivating *Corynebacterium fascians* ATCC No. 21950, in an aqueous nutrient medium containing 1 to 14 percent of an assimilable carbon source and 0.3 to 10 percent of an assimilable nitrogen source, at a pH of 5.0 to 9.0 and at a temperature of 20° to 37°C under aerobic conditions to produce a fermentation broth, filtering or centrifuging the fermentation broth, treating the resultant filtrate or supernatant solution with a strong cation exchange resin, eluting the strong cation exchange resin with a dilute alkaline solution, and then evaporating the eluate obtained.

17. The process according to claim 16, wherein 0.05 to 0.5 percent of corn steep liquor is further added to the nutrient medium.

18. The process according to claim 16, wherein 0.05 to 0.5 percent of corn steep liquor and 1 to 5 percent of at least one of sodium phosphate, potassium phosphate and ammonium phosphate are further added to the nutrient medium.

19. The process according to claim 16, wherein 0.05 to 0.5 percent of corn steep liquor, 0.3 to 2.0 percent of calcium carbonate and 1 to 5 percent of at least one of sodium phosphate, potassium phosphate and ammonium phosphate are further added to the nutrient medium.

* * * * *